United States Patent
Christensen et al.

(10) Patent No.: US 10,934,964 B1
(45) Date of Patent: Mar. 2, 2021

(54) METHODS AND SYSTEM FOR STORING AND ACTIVATING A CALIBRATION FOR A VEHICLE

(71) Applicant: Ford Global Technologies, LLC, Dearborn, MI (US)

(72) Inventors: Michael Scott Christensen, Canton, MI (US); Adam Joseph Krach, Canton, MI (US); Michael Bastanipour, Ferndale, MI (US); Nicholas Herhusky, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/779,979

(22) Filed: Feb. 3, 2020

(51) Int. Cl.
| | | |
|---|---|---|
| *F02D 41/24* | (2006.01) | |
| *G06F 7/483* | (2006.01) | |
| *B60W 50/00* | (2006.01) | |
| *B60W 50/04* | (2006.01) | |

(52) U.S. Cl.
CPC ..... *F02D 41/2432* (2013.01); *F02D 41/2422* (2013.01); *G06F 7/483* (2013.01); *B60W 2050/0062* (2013.01); *B60W 2050/0075* (2013.01); *B60W 2050/0077* (2013.01); *B60W 2050/0078* (2013.01); *B60W 2050/0082* (2013.01); *B60W 2050/0083* (2013.01); *B60W 2050/0085* (2013.01); *B60W 2050/0087* (2013.01); *B60W 2050/0088* (2013.01); *B60W 2050/046* (2013.01); *F02D 2200/701* (2013.01)

(58) Field of Classification Search
None
See application file for complete search history.

(56) References Cited

U.S. PATENT DOCUMENTS

| | | | | |
|---|---|---|---|---|
| 3,492,654 A | * | 1/1970 | Murtaugh, Jr. ......... | G06F 13/18 710/21 |
| 3,903,857 A | * | 9/1975 | Honig ...................... | G06F 7/62 123/406.44 |
| 4,236,213 A | * | 11/1980 | Richardson ......... | H02P 23/0077 701/102 |
| 6,151,612 A | * | 11/2000 | Song ....................... | H03M 7/24 708/204 |
| 6,437,734 B1 | * | 8/2002 | McBurney ............ | G01S 5/0018 342/357.62 |
| 6,510,446 B1 | * | 1/2003 | Fukagawa ........... | G06F 7/49947 708/204 |

(Continued)

OTHER PUBLICATIONS

"Huffman coding," Wikipedia Website, Available Online at https://en.wikipedia.org/wiki/Huffman_coding, Available as Early as Oct. 30, 2001, 10 pages.

(Continued)

*Primary Examiner* — Kevin R Steckbauer
(74) *Attorney, Agent, or Firm* — Geoffrey Brumbaugh McCoy Russell LLP

(57) ABSTRACT

Systems and methods for operating a vehicle that may be driven to or sold in different geographical locations that may have different engine emissions and fuel economy standards are described. The systems and methods may adjust vehicle operation to comply with standards that may be enforced where the vehicle is geographically located. The standards may apply to countries, treaty zones, race track areas, off-road areas, and other geographically related standards.

20 Claims, 7 Drawing Sheets

(56) References Cited

U.S. PATENT DOCUMENTS

| | | | | |
|---|---|---|---|---|
| 7,853,395 B2* | 12/2010 | Guo | ................... | F02D 41/1497 |
| | | | | 701/102 |
| 8,874,630 B2* | 10/2014 | Yu | ........................ | G06F 7/483 |
| | | | | 708/204 |
| 9,646,359 B2* | 5/2017 | Kamenetskaya | ......... | G06T 1/20 |
| 10,528,641 B2* | 1/2020 | Chesavage | ............. | G06F 7/483 |
| 10,740,347 B1* | 8/2020 | Wylie | ................... | G06N 20/00 |
| 2005/0183421 A1* | 8/2005 | Vaynberg | ............... | F01K 25/08 |
| | | | | 60/641.8 |
| 2006/0015844 A1* | 1/2006 | Johnson | ................... | G06F 8/36 |
| | | | | 717/106 |
| 2006/0271615 A1* | 11/2006 | Shearer | .................. | G06F 7/483 |
| | | | | 708/502 |
| 2008/0281767 A1* | 11/2008 | Garner | ................ | G06N 3/0481 |
| | | | | 706/25 |
| 2013/0290043 A1* | 10/2013 | Hoque | .................. | G06Q 10/02 |
| | | | | 705/5 |
| 2016/0180548 A1* | 6/2016 | Kamenetskaya | ....... | G06T 15/04 |
| | | | | 345/582 |
| 2017/0169331 A1* | 6/2017 | Garner | ................... | G05B 13/00 |
| 2018/0101769 A9* | 4/2018 | Garner | ................... | G05B 13/00 |
| 2018/0278264 A1* | 9/2018 | Rovers | ................... | H03M 7/24 |
| 2019/0347309 A1* | 11/2019 | Chesavage | ............ | G06F 17/153 |
| 2020/0074029 A1* | 3/2020 | Date | ....................... | G06F 30/23 |
| 2020/0265045 A1* | 8/2020 | Tepper | ................... | G06N 20/00 |

OTHER PUBLICATIONS

"Text Compression with Huffman Coding," YouTube Website, Available Online at https://www.youtube.com/watch?v=iiGZ947Tcck, Aug. 21, 2015, 3 pages.

Christensen, M. et al., "Methods ans System for Selecting a Calibration for a Vehicle," U.S. Appl. No. 16/779,969, filed Feb. 3, 2020, 37 pages.

* cited by examiner

| 301a | 301b | 302l | 302o | 301f | 301s | 302v | 305e |
| 302a | 302g | 302m | 302p | 302r | 303i | 305b | 304g |
| 302b | 302h | 302n | 302q | 302s | 303j | 304e | 302w |
| 302c | 302i | 301c | 305b | 302t | 304a | 304f | 302x |
| 303a | 303b | 301d | 305c | 303h | 304b | 305c | 303k |
| 302d | 302j | 303d | 303f | 302u | 304c | 305d | 304h |
| 302e | 303c | 303e | 303g | 301g | 304d | 301t | 305f |
| 302f | 302k | 305a | 301e | 301r | 305a | 301u | 302y |

302a_base:

| x/y | 750 | 1000 | 2000 | 2500 | 3000 | 5000 |
|---|---|---|---|---|---|---|
| 0.11 | 0.3 | 0.34 | 0.4 | 0.48 | 0.4 | 0.5 |
| 0.2 | 0.33 | 0.34 | 0.4 | 0.4 | 0.45 | 0.55 |
| 0.4 | 0.45 | 0.43 | 0.35 | 0.42 | 0.47 | 0.55 |
| 0.6 | 0.57 | 0.53 | 0.45 | 0.5 | 0.55 | 0.55 |
| 1.2 | 0.57 | 0.53 | 0.43 | 0.44 | 0.46 | 0.55 |
| 1.5 | 0.77 | 0.57 | 0.4 | 0.4 | 0.42 | 0.55 |

300_CAL1:

| 301a | 301b | 302l | 302o | 301f | 301s | 302v | 305e |
| 302a | 302g | 302m | 302p | 302r | 303i | 305b | 304g |
| 302b | 302h | 302n | 302q | 302s | 303j | 304e | 302w |
| 302c | 302i | 301c | 305b | 302t | 304a | 304f | 302x |
| 303a | 303b | 301d | 305c | 303h | 304b | 305c | 303k |
| 302d | 302j | 303d | 303f | 302u | 304c | 305d | 304h |
| 302e | 303c | 303e | 303g | 301g | 304d | 301t | 305f |
| 302f | 302k | 305a | 301e | 301r | 305a | 301u | 302y |

302a_CAL1:

| x/y | 750 | 1000 | 2000 | 2500 | 3000 | 5000 |
|---|---|---|---|---|---|---|
| 0.11 | 0.3 | 0.34 | 0.4 | 0.48 | 0.4 | 0.5 |
| 0.2 | 0.33 | 0.34 | 0.4 | 0.4 | 0.45 | 0.55 |
| 0.4 | 0.45 | 0.43 | 0.35 | 0.42 | 0.47 | 0.55 |
| 0.6 | 0.57 | 0.53 | 0.45 | 0.50 | 0.55 | 0.55 |
| 1.2 | 0.77 | 0.57 | 0.4 | 0.4 | 0.42 | 0.55 |
| 1.5 | 0.77 | 0.57 | 0.4 | 0.4 | 0.42 | 0.55 |

302a_base_bin:

| x/y | 750 | 1000 | 2000 | 2500 | 3000 | 5000 |
|---|---|---|---|---|---|---|
| 0.11 | 1111101 | 11100 | 000 | 111111101 | 000 | 11101 |
| 0.2 | 11111100 | 11100 | 000 | 000 | 101 | 100 |
| 0.4 | 101 | 111100 | 11111101 | 1101 | 111111100 | 100 |
| 0.6 | 1100 | 111101 | 101 | 11101 | 100 | 100 |
| 1.2 | 1100 | 111101 | 111100 | 111111110 | 111111111 | 100 |
| 1.5 | 1111100 | 1100 | 000 | 000 | 1101 | 100 |

|  | Parameter value | Frequency of occurrence |
|---|---|---|
| 1 | 0.4 | 14 |
| 2 | 0.55 | 12 |
| 3 | 0.45 | 6 |
| 4 | 0.57 | 6 |
| 5 | 0.42 | 5 |
| 6 | 0.34 | 4 |
| 7 | 0.5 | 4 |
| 8 | 0.43 | 3 |
| 9 | 0.53 | 3 |
| 10 | 0.77 | 3 |
| 11 | 0.3 | 2 |
| 12 | 0.33 | 2 |
| 13 | 0.35 | 2 |
| 14 | 0.47 | 2 |
| 15 | 0.48 | 2 |
| 16 | 0.44 | 1 |
| 17 | 0.46 | 1 |

METHODS AND SYSTEM FOR STORING AND ACTIVATING A CALIBRATION FOR A VEHICLE

FIELD

The present description relates to methods and a system for storing and recalling more than one calibration in a controller of a vehicle. The calibrations may include calibration parameters that allow vehicle operation to be adjusted for the vehicle's geographical location and regulations that are in force at the vehicle's geographical location.

BACKGROUND AND SUMMARY

A vehicle may include a controller that includes a calibration. The calibration may be a collection of control parameters including integer numbers, logical values, and floating point numbers that may be the basis for adjusting vehicle actuators and estimating vehicle control parameters from sensor inputs. In particular, a software control strategy within the controller may determine vehicle conditions from sensors using some of the control parameters in the calibration and the control strategy may adjust actuators based on the vehicle conditions and other control parameters in the calibration. The controller is programmed with a single calibration before the exits a manufacturing plant, but it may be desirable to store multiple calibrations in a single controller so that the controller may adjust the vehicle's operation to the vehicle's geographic location. However, 32 bits of controller memory may be required to store each floating point number that is included in a calibration. Consequently, it may take large amounts of controller memory to store multiple calibrations when the calibration includes 32 bit control parameters. Therefore, it may be desirable to provide a way of loading alternative calibrations into a controller without having to use large amounts of memory.

The inventors herein have recognized the above-mentioned issues and have developed an operating method for a vehicle, comprising: storing a group of vehicle calibrations into controller read-only memory, each calibration in the group of vehicle calibrations including a table or function that is common to the group of vehicle calibrations, values included in the table or function stored as encoded binary values; converting the encoded binary values to floating point values and storing the floating point values in random access memory; and adjusting one or more actuators responsive to the floating point numbers.

By storing calibration parameters as encoded binary values, it may be possible to provide the technical result of storing multiple calibrations in a single controller without using excessive amounts of controller memory. In one example, calibration control parameters may be stored as unique binary encoded values that are a function of the frequency of occurrence of 32-bit floating point number values in a table or function that is common to a plurality of different calibrations. Thus, a plurality of calibrations may be stored in controller memory with control parameters that are encoded binary numbers or values. One of the calibrations may be activated by converting the control parameters that are stored within the calibration as encoded binary values into 32-bit floating point numbers that may be the basis for controlling an engine, transmission, electric machine, or other device. And, since the binary numbers may be stored with much less memory than the 32-bit floating point numbers, it may be possible to store a plurality of calibrations in a smaller amount of controller memory.

The present description may provide several advantages. For example, the approach may reduce a total amount of memory used to store a plurality of vehicle calibrations. In addition, the vehicle calibrations may be changed automatically without input from a vehicle manufacturer or from the vehicle's owner. Further, the approach may provide for using smaller amounts of memory without having to sacrifice control variable resolution or table size.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 3 shows an example calibration and tables that are incorporated within the calibration;

FIG. 4 shows how control parameters within a plurality of tables may be ordered as a function of frequency of occurrence within the plurality of tables;

DETAILED DESCRIPTION

Figure 5:
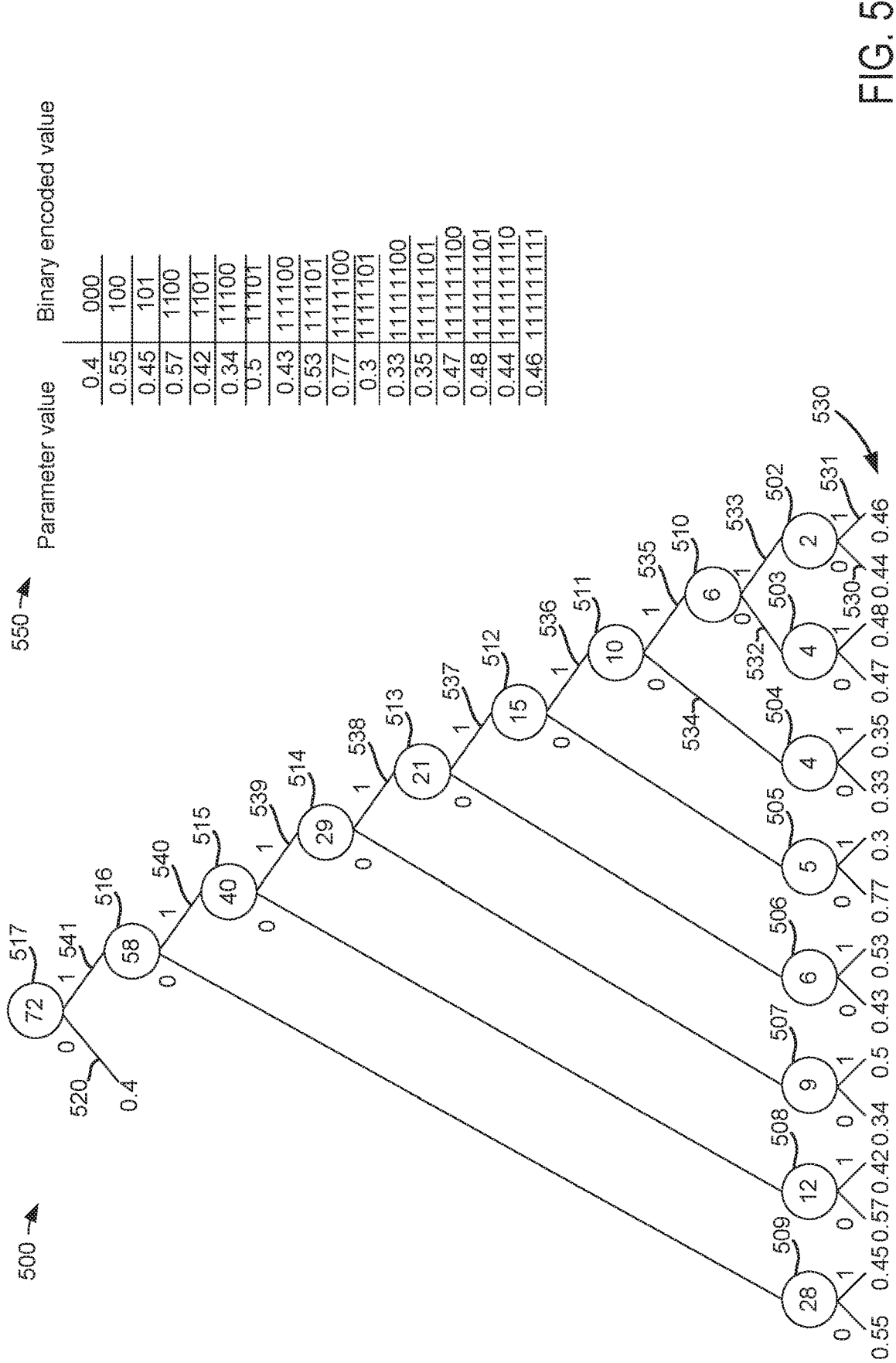
FIG. 5 shows a tree of nodes for encoding floating point numbers into binary encoded values and binary encoding according to the tree.
Figure 6:
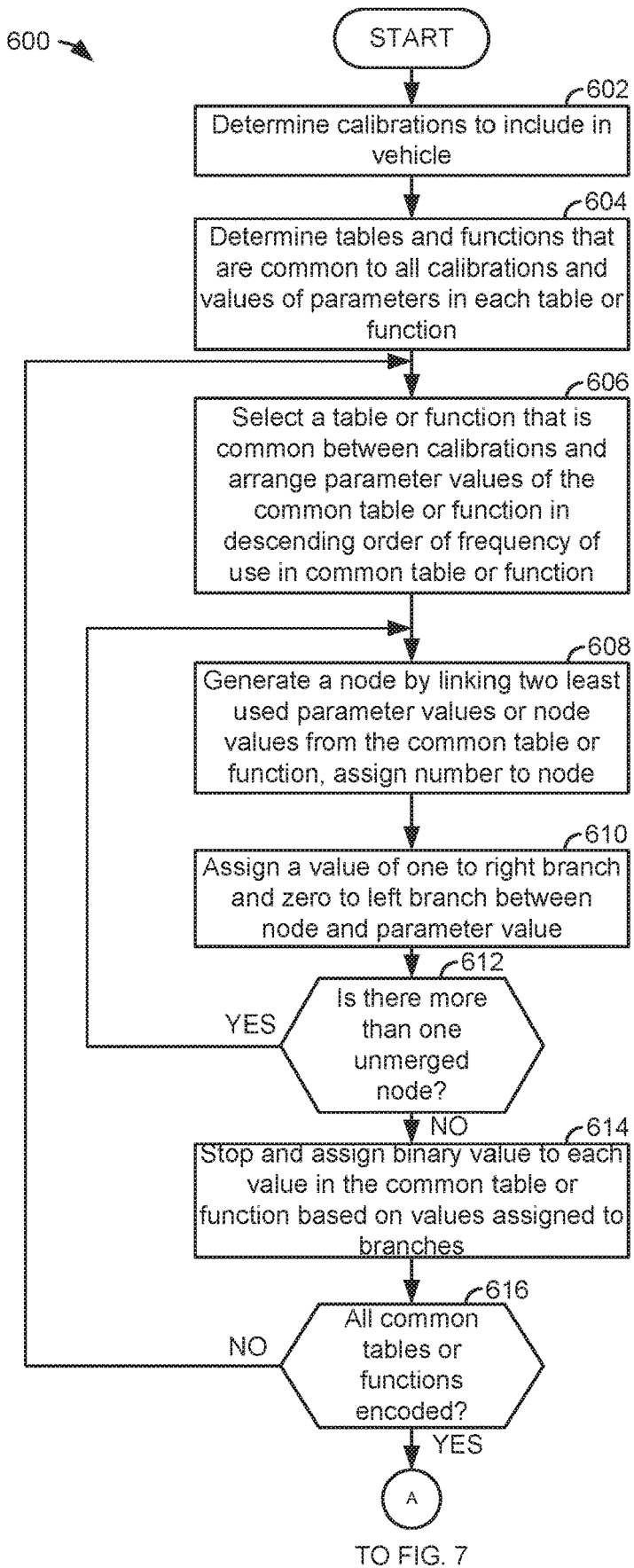
FIGS. 6 and 7 show a method for operating a vehicle with a plurality of different calibrations.
Figure 7:
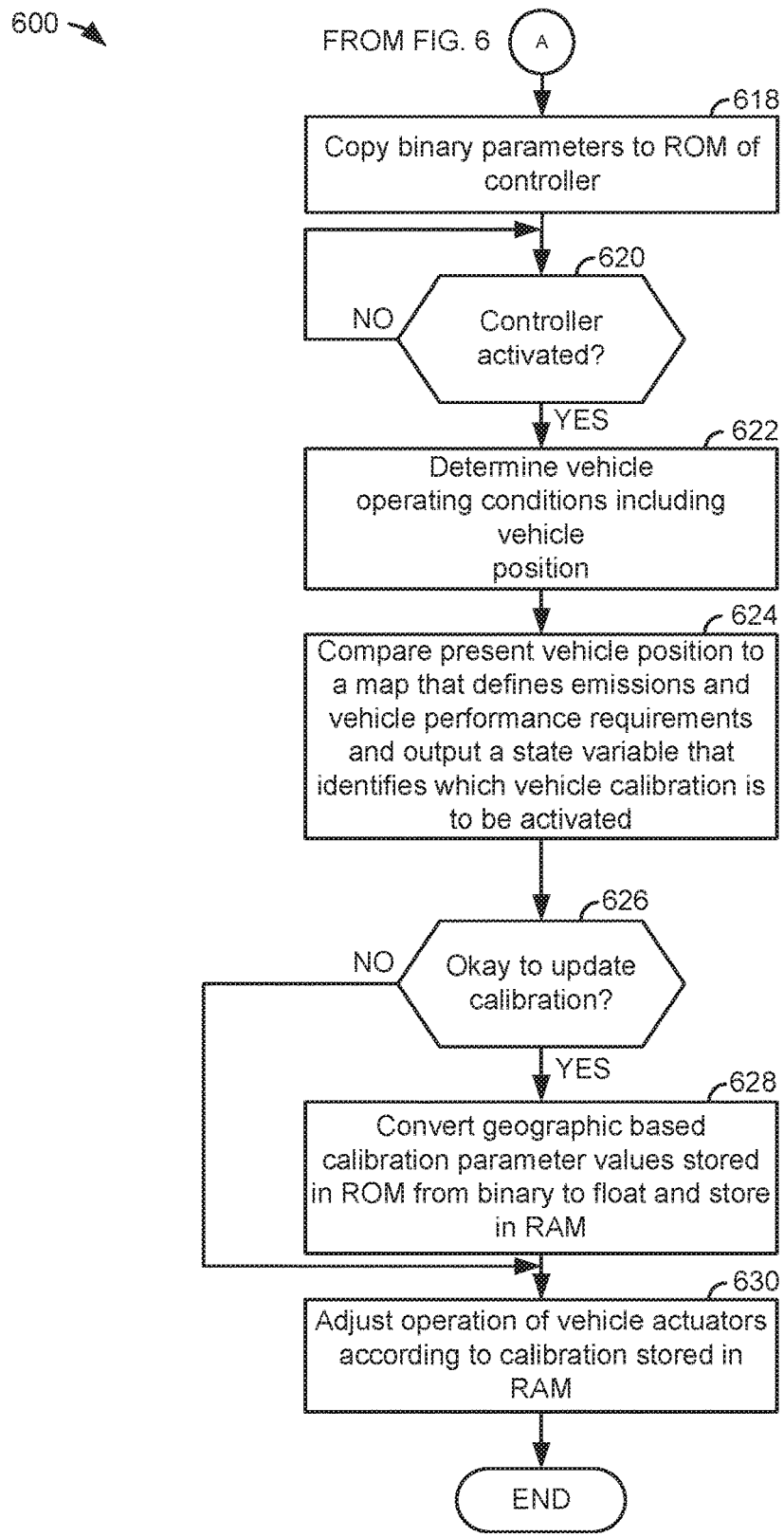

The present description is related to reducing an amount of memory used to store a plurality of vehicle calibrations in a single vehicle controller. The vehicle calibrations may affect a way a vehicle operates and the vehicle calibrations may comprise a plurality of control parameters. For example, the vehicle calibrations may affect vehicle emissions, fuel economy, and/or performance. It may be desirable to switch which of the plurality of calibrations is activated based on the geographical position of a vehicle, but storing multiple calibrations may require large amounts of controller memory. However, the amount of memory used to store a calibration may be reduced when control parameters that are included in the calibration are stored as encoded binary values instead of 32-bit floating point numbers. The vehicle calibrations may be useful to operate an engine of the type shown in FIG. 1. The vehicle calibrations may also include control parameters for transmissions and electric machines included in a driveline as shown in FIG. 2. The vehicle calibrations may include Boolean values and/or numeric values that are part of a function or table as shown in FIG. 3. Control parameters within the calibration may be sorted as a function of frequency of occurrence in a table or function as shown in FIG. 4. The control parameters may be encoded to binary values as shown in FIG. 5. A method for reducing an amount of controller memory applied to operate a vehicle with a plurality of calibrations is shown in FIGS. 6 and 7.

Figure 1:
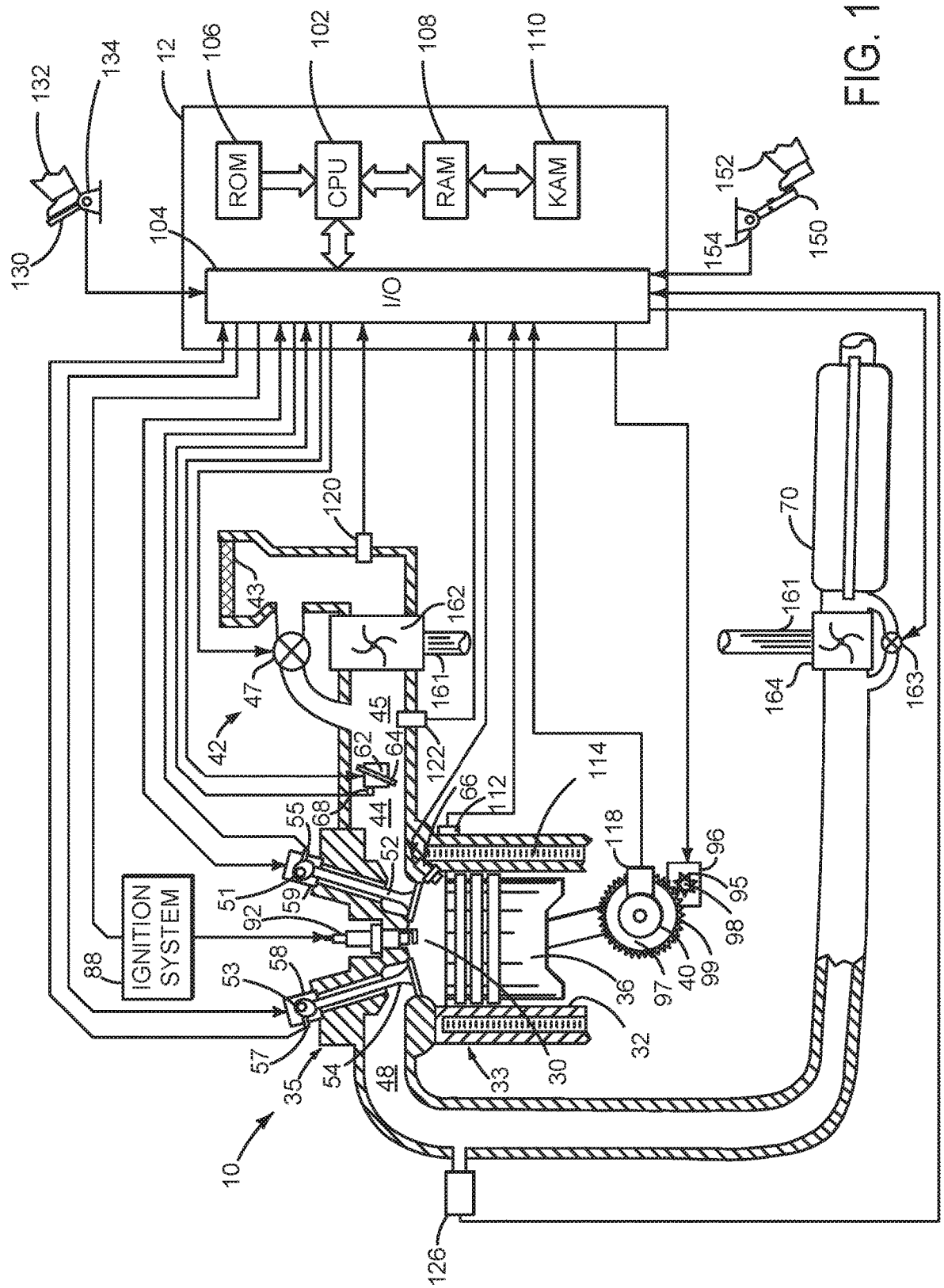
FIG. 1 is a schematic diagram of an engine.
Figure 2:
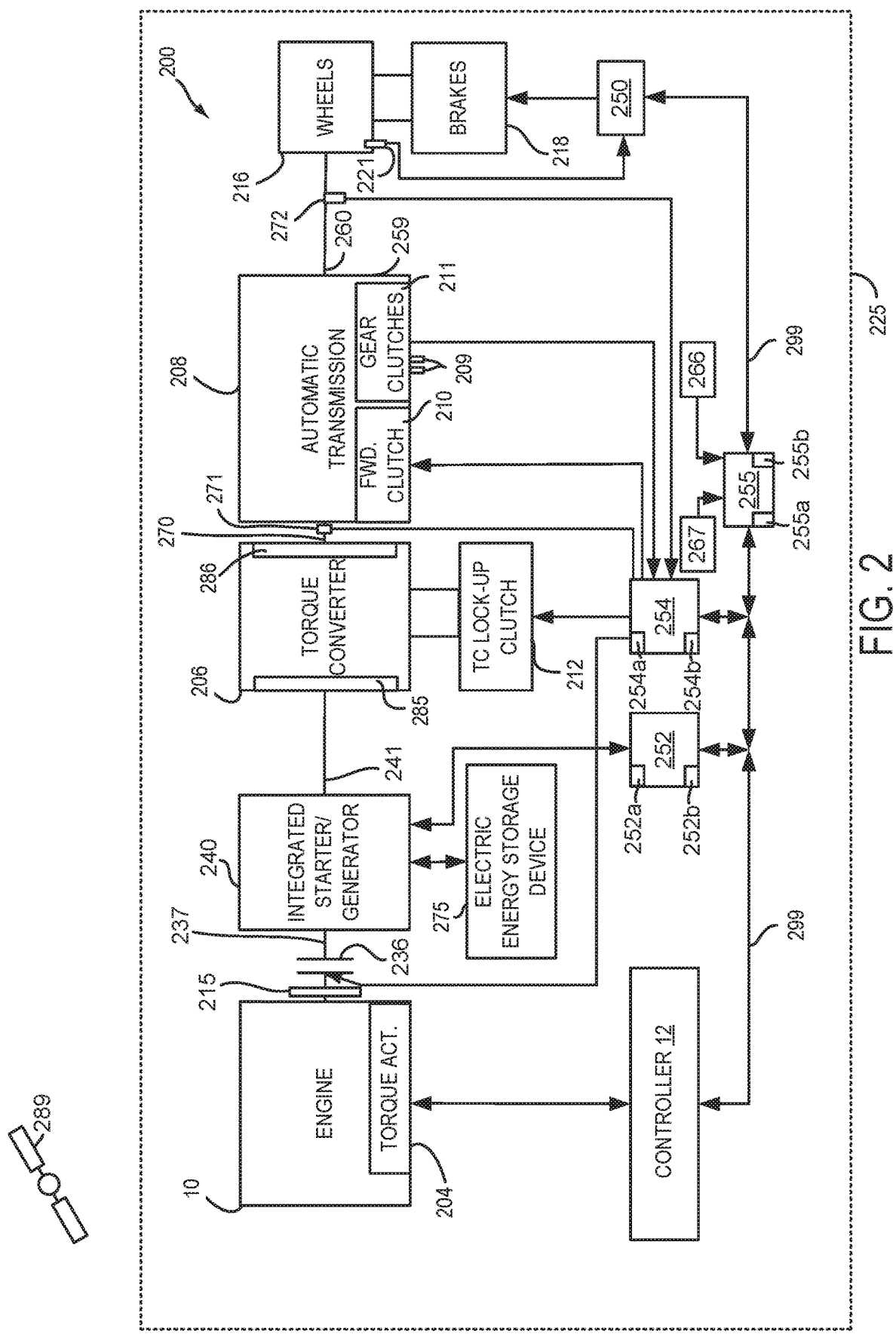
FIG. 2 is a schematic diagram of a hybrid vehicle powertrain.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12, and the pulse width may be determined via calibration values that are stored in a table or function in the memory of engine controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory or ROM), random access memory 108 (RAM), keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 152; a position sensor 154 coupled to brake pedal 150 for sensing force applied by human driver 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC.

Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 may include a plurality of calibrations stored within controller memory that cause the controller 12 to operate the engine in a desired way such that engine 10 meets legislative emissions, drivability constraints, legislative fuel economy mandates, and engine performance metrics. A first calibration may cause controller 12 to operate the engine according to legislative emissions, drivability constraints, legislative fuel economy mandates, and engine performance metrics of a first country (e.g., Canada). A second calibration, different from the first calibration, may cause controller 12 to operate the engine according to legislative emission, drivability constraints, legislative fuel economy mandates, and engine performance metrics of a second country (e.g., United States of America). Similarly, controller 12 may include unique calibrations for different states, providences, or other governmental districts. Controller 12 may also include unique calibrations for off-road areas, race tracks, and other privately held areas. may adjust the pressure in boost chamber 45 according to a calibration that includes tables and/or functions for determining boost pressure. For example, calibration tables may provide boost pressures that are a function of engine speed and driver demand torque.

FIG. 2 is a block diagram of a vehicle 225 including a powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. Vehicle system controller 255 includes RAM 255a and ROM 255b. Electric machine controller includes RAM 252a and ROM 252b. Transmission controller 254 includes RAM 254a and ROM 254b. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Vehicle system controller 255 may communicate with human/machine interface 267. Human/machine interface may be a touch screen display, key board and display, or other known type of human/machine interface. Global positioning satellite 289 sends position information and timing information to global positioning receiver 266. Global positioning receiver 266 estimates a geographical position of vehicle 225 based on the position information and timing information provided by global positioning satellite 289 and other global positioning satellites (not shown).

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of powertrain disconnect clutch 236 through dual mass flywheel 215. Disconnect clutch 236 may be electrically or hydraulically actuated. The downstream side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the IS G 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Each of controller 12, electric machine controller 252, transmission controller 254, and vehicle system controller 255 may include a plurality of individual calibrations that are stored in their respective ROM as described in more detail in FIG. 3. For example, engine controller 12 may contain a base calibration, a calibration for a first country, a calibration for a second country, a calibration for a first state or providence, a calibration for a second state or providence, and so on. Further, engine controller 12 may also contain a calibration for off-road conditions and a calibration for race track operation. Likewise, electric machine 252, transmission controller 254, and vehicle system controller 255 may also contain base calibrations and individual calibrations for the previously mentioned geographical areas described with regard to the engine controller.

Thus, the system of FIGS. 1 and 2 provides for a system, comprising: an engine; a motor/generator; a transmission mechanically coupled to the engine and the motor/generator; and a controller including executable instructions stored in non-transitory memory that cause the controller to convert binary encoded baseline calibration parameters stored in controller memory into floating point calibration parameters, and adjust an actuator of one or more of the engine, transmission, or motor/generator responsive to the floating point calibration parameters. The system further comprises additional instructions to convert binary encoded alternative calibration parameters stored in controller memory into alternative floating point calibration parameters, and adjust the actuator of one or more of the engine, transmission, or motor/generator responsive to the alternative floating point calibration parameters. The system further comprises additional instructions to determine a position of a vehicle and convert the binary encoded baseline calibration parameters stored in controller memory into floating point calibration parameters responsive to the position of the vehicle. The system further comprises additional instructions to determine the position of the vehicle and convert alternative binary encoded baseline calibration parameters stored in controller memory into alternative floating point calibration parameters responsive to the position of the vehicle. The system includes where the binary encoded baseline calibration parameters are parameters of a table or function. The system includes where the binary encoded baseline calibration parameters are based on a plurality of floating point values included in a plurality of tables or functions. The system includes where the table or function is common to a plurality of calibrations.

Referring now to FIG. 3, a pictorial representation and description of memory storage formats for an example calibration for an engine controller is shown. FIG. 3 also shows an example of a table that may be stored in a base calibration and an example of a common table stored in an alternative calibration.

An example base calibration 300 is shown; however, the dimensions of base calibrations stored within a controller may be larger or smaller than example base calibration 300. Base calibration 300 includes tables 302*a*-*y* of varying dimensions, functions 303*a*-*k* of varying dimensions, individual scalars in the form of real numbers 301*a*-*t*, logical variables 304*a*-*h*, and break point values 305*a*-*f*. The base calibration 300 may be stored in ROM when the vehicle is manufactured and each controller may have a unique base calibration that forms a basis for determining values of control variables from sensor inputs and for determining values of control variables for adjusting actuator outputs. Values in the base calibration may be referenced via a strategy that resides in a controller to operate a device of the vehicle (e.g., an engine, transmission, or electric machine). Entries in the tables, functions, scalars, logical variables, and beak point values may be referred to as control parameters. Values in the base calibration 300 may be stored as 32-bit floating point numbers during vehicle development and values may be stored in the base calibration in an encoded binary format when the base calibration is stored in the vehicle with other calibrations at the time of vehicle manufacture.

An example table 302*a* from base calibration 300 is shown below calibration 300 and it is labeled 302*a* base to indicate that the table is table 302*a* in calibration 300 with variables stored in 32-bit floating point format. In this example, table 302*a*_base has dimensions of 6 rows of cells by 6 columns of cells, or 6×6 36 elements in 36 cells make up table 302*a*_base. However, it should be noted that calibration 300 may include many tables 302 having different demensions. For example, a first table 302*a*_base may be a 4×4 table and a second table 302*b* may be a 6×8 table, the first table and the second table may be included in the calibration 300.

In this example, table 302*a*_base is shown with column break points 310 and row brake points 311. The column and row break points 310 and 311 make up break points 305*a* and they may be stored at ROM locations that are apart from ROM locations where values in table 302*a*_base are stored. The column break points in this example begin with a value of 750 and increase to an upper value of 5000. In this example, the column break points represent engine speed values for interpolating values between the cells of table 302*a*, but they may represent other values as well (e.g., electric machine current) in other tables. The row break points begin with a value of 0.11 and increase to a value of 1.5. In this example, row break points represent engine load values for interpolating values between the cells of table 302*a*, but they may represent other values as well (e.g., transmission fluid temperature) in other tables.

The table cell entry [1,1] of table 302*a*_base is indicated at 312 and it contains a floating point real number having a value of 0.3. Table cell entry [6,1] is indicated at 313 and it contains a floating point real number having a value of 0.77. The table cell entry [1,6] of table 302*a* is indicated at 314 and it contains a floating point real number having a value of 0.5. Table cell entry [6,6] is indicated at 315 and it contains a floating point real number having a value of 0.55. Thus, a base calibration may include a plurality of tables and the plurality of tables may include a plurality of values that may be stored as floating point real numbers. Functions may be stored in a similar way as tables, but functions may be limited to one column by N rows or one row by N columns, where N is a positive integer number. Each base table may be assigned a unique name by which it may be referenced. For example, base table 302*a*_base may be named EGRvB to indicate that it may describe base requested exhaust gas recirculation (EGR) valve positions, and individual cells in the table may be referenced via matrix notation. For example, cell [1,1] of the base requested EGR valve position table may be referenced as EGRvB[1,1]. A base table 302*b*_base for engine spark may be named SPK_B, and so on for other included base tables 302*a*-*y*.

FIG. 3 also shows an alternative calibration that may be stored in a controller that includes base calibration 300. In this example, the alternative calibration is shown at 300_CAL1. The alternative calibration 300_CAL1 may include all of the same tables, functions, individual scalars, logical variables, and break point values as base calibration 300. The tables of baseline calibration 300 are common with the base tables of alternative calibration 300_CAL1. The base calibration 300 and the alternative calibration 300_CAL1 may both be stored in a single controller and both calibrations may be accessed via a single strategy.

In this example, table 302*a* shown in calibration 300 is common with table 302*a* of calibration 300_CAL1. However, values stored in the table 302a for the plurality of different calibrations may be different. Thus, values of control parameters that are stored in a table or function need not be the same from one calibration to another calibration for the table to be common. Rather, the commonality of the table or function is that the table provides the same function no matter which calibration is stored in the table. In other words, if the table provides output for a particular purpose in one calibration (e.g., base spark timing), then the common table also provides output for the same purpose (e.g., base spark timing) in a different calibration, even though values of the output may be different. Further, the table or function that is common between different calibrations is dimensionally consistent, irrespective of the calibration values that are stored in the table or function.

An example table 302a from alternative calibration 300_CAL1 is shown below calibration 300_CAL1 and it is labeled 302a CAL1 to indicate that the table is table 302a in calibration 300_CAL1 with variables stored in 32-bit floating point format. Calibration table 302a CAL1 has the same dimensions as calibration table 302a base of base calibration 300 and it performs the same function as table 302a_base. However, some of the numeric entries of calibration table 302a_CAL1 are different from those of base table 302a_base. For example, entry [5,1] of table 302a_CAL1 indicated at 374, holds a value of 0.77, whereas entry [5,1] of table 302a_base holds a value of 0.57. Thus, the base calibration differs from the alternative calibration, yet table 302a is common to both the base calibration and the alternative calibration. The base calibration and the alternative calibration may be stored in controller memory, including using 32-bit floating point numbers for the values stored in tables 302a_base and 302a_CAL1. However, each calibration that is stored in controller memory may require a significant amount of memory when real numbers like the values of table 302a_base and table 302a_CAL1 are stored as 32-bit floating point numbers. The present disclosure illustrates how multiple calibrations may be stored in a single controller using a smaller amount of controller memory. Table 302a_base bin is an example of how table 302a_base may be stored in controller memory via applying binary encoding to the values stored in the table.

Table 302a_base bin is shown with the same break points 310 and 311 that are shown in table 302a_base. Further, table 302a_base bin is a 6×6 table just like table 302a_base. However, table 302a_base bin includes binary encoded values in its table cells. For example, table cell [1,1] of table 302a_base bin houses binary encoded value 1111101. The ones and zeros of the binary encoded value each represent one bit. Moving from right to left of number 1111101, the first bit value is one, the second bit value is zero, the third bit value is one, and so on. The value 1111101 is the encoded binary equivalent value to the value 0.3 that is stored in cell [1,1] of table 302a_base. Similarly, 1111100 of cell [6,1] at 313 in table 302a_base bin is the encoded binary equivalent value to 0.77 that is stored in cell [6,1] at 313 in table 302a_base bin. Thus, instead of storing values like 0.3 and 0.77 as 32-bit floating point numbers, the numbers may be encoded into fewer bits (e.g., seven bits instead of 32 bits). The encoded binary values of table 302a_base bin may be determined as discussed in the description of FIGS. 4-7.

Referring now to FIG. 4, table 400 shows how the values of tables 302a_base and 302a_CAL1 may be ordered by frequency of occurrence to generate the encoded binary values. Table 400 includes seventeen rows where each row includes a parameter value and a frequency of occurrence in tables 302a_base and 302a_CAL1. The first parameter value is 0.4 and it occurs a total of fourteen times in tables 302a_base and 302a_CAL1, it occurs seven times in each table respectively. Similarly, the second parameter value is 0.55 and it occurs a total of twelve times in tables 302a_base and 302a_CAL1. The frequency of occurrence is arranged from highest frequency of occurrence to lowest frequency of occurrence. Table 400 may be the basis for constructing node tree 500 in FIG. 5, and binary encoding node tree 500 is the basis for generating the encoded binary values shown in table 550.

Referring now to FIG. 5, an example binary encoding node tree 500 for encoding the values of tables 302a_base and 302a_CAL1 of FIG. 4 is shown. The encoding described herein is exemplary in nature and it should not be considered as limiting. For example, root node 517 includes a left branch 520 and a right branch 541. A bit value of zero is assigned to branch 520 and a bit value of one is assigned to branch 541. However, a bit value of one may be assigned to branch 520 and a bit value of zero may be assigned to branch 541, if desired.

Binary encoding node tree 500 may be generated via arranging the parameter values shown in table 400 side-by-side in a horizontal direction as shown at 530. The right most value is a value that occurs least frequently in tables 302a_base and 302a_CAL1. The values proceed from right to left according to increasing order of frequency of occurrence in tables 302a_base and 302a_CAL1. From right to left the values in the table are paired and the pairs of values merge into nodes. For example, the value 0.46 is tied to node 502 via branch 531 and value 0.44 is tied to node 502 via branch 530. The right branch 531 is assigned a value of one and the left branch is assigned a value of zero. This process is repeated after node 502 is formed to form nodes 503-509. The value 0.4 does not have a corresponding paired value so it is coupled to root node 517 via branch 520. The values shown in nodes 502-509 correspond to the number of occurrences of the table values that are linked or branched to the nodes. For example, values 0.44 and 0.46 occur at a frequency of one time each in tables 302a_base and 302a_CAL1. The value in node 502 is the sum of the occurrences of values 0.44 and 0.46 in tables 302a_base and 302a_CAL1, or 1+1=2. Similarly, the value 0.48 occurs twice in tables 302a_base and 302a_CAL1 and the value 0.47 occurs twice in tables 302a_base and 302a_CAL1. Therefore, the value in node 503 is the sum of the occurrences of values 0.48 and 0.47 in tables 302a_base and 302a_CAL1, or 2+2=4. The values in nodes 504-509 are determined in a similar way. Nodes 502-509 may be referred to as leaf nodes since they are farthest away from root node 517.

The leaf nodes 502-509 are then paired from right to left to other nodes. Specifically, node 502 and node 503 branch to in internal node 510. The value of internal node 510 is determined via summing the values of nodes 502 and 503. A value of one is assigned to the right branch 532 and a value of zero is assigned to the left branch 533. The next leaf node 504 branches back to internal node 511 and internal node 510 also branches back to internal node 511. A value of one is assigned to the right branch 534 and a value of zero is assigned to the left branch 535. This process is repeated for leaf nodes 505-509 each time branching back from a leaf node to a new internal node that is coupled to the leaf node and an internal node. Internal nodes 510-516 are generated in this way and the values in the internal nodes reflect the frequency of occurrence of values that branch back to the internal nodes. The value in the root node 517 corresponds to the total number of table cells or entries in tables 302a_base and 302a_CAL1, or 72. The last unpaired value 0.4 branches back directly to the root node 517.

Once binary encoding node tree 500 is completed (e.g. when there are no more table values to branch back from a leaf node back to an internal node or the root node), the binary encoded values that represent the floating point numbers (e.g., 0.46; 0.44; 0.48; etc.) in the tables may be determined from the binary values that are assigned to the branches. For example, the encoded value of value 0.46 that is stored in cell [5,5] of the 302a_base table may be determined starting at the root node and following branches from the root node 517 to the value 0.46 collecting a bit value at each branch until the value 0.46 is reached. Specifically, to reach node 516 from node 517, branch 541 is followed and branch 541 has been assigned a value of one so the most significant bit (e.g., bit farthest to the left of the binary encoded value) of the binary encoded value is one. To reach node 515 from node 516, branch 540 is followed and branch 540 has been assigned a value of one so the next most significant bit of the binary encoded value is also one. This procedure may be followed so that a bit for each of branches 531 and 533-540 is assembled to generate the binary encoded value of 111111111. Binary encoded values for each of the table values may be determined in a similar way. Table 550 shows the binary encoded value for each table value of tree 500. For example, the binary encoded value corresponding to the table value of 0.4 is 000, the binary encoded value for table value 0.55 is 100, and so on.

The example of FIG. 5 describes how binary encoded values may be determined when two calibrations are to be included in a controller. However, the procedure may be extended to numbers of calibrations greater than two (e.g., twenty). A binary encoding tree for encoding values of more than two tables may be generated similar to the way binary encoding node tree 500 was generated.

Referring now to FIGS. 6 and 7, a method for operating a vehicle powertrain is shown. At least portions of method 600 may be implemented as executable controller instructions stored in non-transitory memory. Additionally, portions of method 600 may be actions taken via a controller in the physical world to transform an operating state of an actuator or device. The method of FIGS. 6 and 7 may be incorporated into the system of FIGS. 1 and 2.

At 602, method 600 determines the vehicle calibrations to include in a vehicle. The vehicle calibrations may be based on the geographic area in which the vehicle is being sold. In other examples, the vehicle calibrations may be based on a geographical region for which the vehicle is being manufactured (e.g., Europe or North America). The number of vehicle calibrations may be greater than one and less than one hundred, for example. The vehicle calibrations to be included in a vehicle may be determined via a computer or other vehicle calibrations may be manually selected. Method 600 proceeds to 604 after the calibrations to include in the vehicle have been determined.

At 604, method 600 determines all the functions and tables that are common to the calibrations that are to be included with the vehicle. In one example, names of functions and tables in each of the calibrations are compared to names and functions of tables and functions of other calibrations that are to be included with the vehicle. Tables and functions having like names and dimensions may be determined to be common between the calibrations. For example, if a base calibration includes a table named SPK_32 having dimensions of 5 by 6 and a second calibration includes a table named SPK_32 having dimensions of 5 by 6, then method 600 may determine that the tables are common to the calibrations. Method 600 determines values of variables stored in the common tables and functions. The tables and functions along with their values may be stored in a cloud or mainframe computer at the time that the values of the tables and functions are determined. Method 600 proceeds to 606 after determining tables and functions that are common to the calibrations that are to be included in the vehicle as well as values of control parameters that are stored in the tables or functions.

At 606, method 600 selects a table or function that is common between calibrations for encoding values in the table from 32-bit floating point format to binary encoded format. In one example, method 600 begins with selecting lowest alpha numeric named tables and/or functions and it ends with highest alpha numeric named tables and/or functions. For example, method 600 selects a table named A1256 before a table named ZH564. Once a common table or function is selected, values stored in all of the tables of all calibrations that are to be stored in the vehicle are determined and ordered from highest frequency of occurrence in the calibrations to lowest frequency of occurrence in the calibrations as shown in FIG. 4. Method 600 proceeds to 608.

At 608, method 600 generates a node by linking two values via branches as shown in FIG. 5. Method 600 may also assign a number to the node as discussed in the description of FIG. 5. The assigned number may be a sum of the total number of times that the two values are used in the selected common table or function. If all values of the common table or function have been linked to nodes via branches, then the nodes are linked together via branches. The nodes are linked via branches until only a root node is present as shown in FIG. 5. Method 600 proceeds to 610.

At 610, method 600 assigns binary values to the right and left branches that lead to the most recently formed node. In one example, a value of one is assigned to right branches and a value of zero is assigned to left branches. Method 600 proceeds to 612.

At 612, method 600 judges if there is more than one unmerged node (e.g., if there is more than one node that has not been linked back to a root node via branches). If so, the answer is yes and method 600 returns to 608 to merge or link unmerged or unlinked nodes back to a single root node via branches as shown in FIG. 5. If not, method 600 proceeds to 614.

At 614, method 600 ceases linking nodes via branches and assigns an encoded binary value to each value in the common table for each of the calibrations that are included with the controller. The binary encoded values are assigned based on the tree structure that was built between the nodes as described at 608 and 610. In particular, the binary ones and zeros are collected beginning at the root node and a binary digit is added for each branch between the root node and the value that is being assigned the binary encoded value. Thus, the most significant binary digit (e.g., left hand side binary value) assigned to a value in the common table is a value based on whether the route to the value is a left branch or right branch from the root node. A binary digit is added for each node that is passed through on the way to the value that is being assigned the binary encoded value. Thus, as shown and described in the example of FIG. 5, the value of 0.46 is assigned a binary value of 111111111. Each value that is stored in the common table for a particular calibration is assigned a binary encoded value in this way, and each calibration includes the common table filled with values that make each calibration unique. The binary encoded values are stored in the common table for each calibration replacing the 32-bit floating point numbers that were previously in the common table for each calibration.

Alternatively, the binary encoded values may be stored in a table that is similar to the common table. Method 600 proceeds to 616.

At 616, method 600 judges if all common tables and/or functions for each calibration have been encoded. In other words, method 600 judges if values in all common tables and/or functions of each calibration have been replaced by binary encoded values. Alternatively, method 600 may judge if tables holding binary encoded values representative of 32-bit floating point values have been generated for all tables and/or functions holding 32-bit floating point values for each calibration. If so, method 600 proceeds to 618. Otherwise, method 600 returns to 606 to binary encode values of any remaining tables and calibrations that have not been converted to binary encoded values.

At 618, method 600 copies all of the binary encoded values in all of the common tables of each calibration to ROM of the controller. Thus, a table in a calibration that is copied to ROM may be similar to table 302$a$\_base bin shown in FIG. 3. Each of the tables or functions of the multiple calibrations may be stored to ROM in this way so that a plurality of calibrations including tables and functions having values stored in encoded binary format are stored to ROM.

Method 600 proceeds to 620.

At 620, method 600 judges if a controller of a vehicle is activated. A controller of a vehicle may be activated when the controller is electrically coupled to a power source. For example, a portion of a controller may be activated when the controller is electrically coupled to the vehicle's battery. In other examples, the controller may be activated in response to a request to operate the vehicle. If method 600 judges that the controller is activated, the answer is yes and method 600 proceeds to 622. Otherwise, the answer is no and method 600 may return to 620 and wait for the controller to be at least partially activated.

At 622, method 600 determines vehicle operating conditions including the vehicle's geographical position. The controller may determine the vehicle's geographical position via information that is provided to a GPS receiver. In addition, the data that is provided to the GPS receiver may be applied to reference geographical maps that are stored within the controller or the GPS receiver. Method 600 proceeds to 624 after the vehicle position is determined.

At 624, method 600 compares the vehicle's present location to a map that defines vehicle emissions and performance requirements according to vehicle regulations. Method 600 determines which calibration stored in the controller meets emissions and performance regulations according to the vehicle's present geographical location. In one example, the vehicle's present geographical position is input to a routine and the routine outputs a name of a vehicle calibration that allows the vehicle to meet emissions and performance regulations according to the vehicle's present location. In this way, the vehicle's calibration may be selected from a plurality of vehicle calibrations. The calibrations may include calibrations for off-road use, country specific calibrations, and calibrations that fall under treaties. The name of the calibration may be expressed as a state variable (e.g., US1—calibration; EU1—calibration; etc.).

Method 624 proceeds to 626 after determining the name of the calibration that meets requirements of the vehicle's present geographical location.

At 626, method 600 judges whether or not vehicle conditions are suitable to update the vehicle calibration. In one example, method 600 may wait until specific conditions are met before a new calibration may be the basis for operating the vehicle. Method 600 may load a new calibration when method 600 judges that the vehicle's geographical location has changed from a first geographical region to a second geographical region. In addition, method 600 may require that the vehicle and the vehicle's propulsion source (e.g., internal combustion engine or electric machine) be deactivated and in a stopped state (e.g., not rotating). In other examples, method 600 may judge that driver demand power or torque be less than a threshold value before method 600 determines that it is acceptable to update the present vehicle calibration. If method 600 judges that it is okay or acceptable to update the vehicle's calibration, the answer is yes and method 600 proceeds to 628. Otherwise, the answer is no and method 600 proceeds to 630.

At 628, method 600 converts binary encoded values of the selected calibration that are stored in tables and/or functions in controller ROM into 32-bit floating point number values. Method 600 also stores the 32-bit floating point numbers into tables and/or functions in RAM. The names of tables in RAM may be the same as the names of tables in ROM.

In one example, method 600 may convert binary encoded values that are stored in tables or functions in ROM into 32-bit floating point values via perform a look-up. Specifically, method 600 may reference or index a function or table in which binary encoded values are paired with the 32-bit floating point numbers to perform the conversion. The 32-bit floating point numbers are the numbers that the binary encoded values represent. The function or table may be referenced via the binary encoded value that is stored in a table or function in ROM and the function or table outputs the 32-bit floating point number. The converted 32-bit floating point number is stored in a table or function in RAM as part of the newly activated calibration. By storing the values to RAM, the values may be accessed at a rate that may be desirable for real-time control. For example, a table that is similar to table 550 may be referenced via binary encoded values and the table or function outputs 32-bit floating point numbers that are represented by the binary encoded value. The 32-bit floating point numbers may then be used by the controller's strategy as part of a vehicle calibration to operate vehicle sensors and actuators. Binary encoded values stored in each table and/or function that is stored as part of the selected calibration may be converted in this way so that the control parameter values in the selected calibration may be converted into a numbers that are useful to the strategy to operate the vehicle. Method 600 proceeds to 630 after binary encoded values of the selected calibration are stored and loaded into RAM.

At 630, data from vehicle sensors is interpreted according to the selected calibration that is stored in RAM. In addition, actuators are adjusted according to the selected calibration that is stored in RAM. For example, values in one table of the selected calibration may be used to determine engine air mass flow and the engine air mass flow may be used to adjust a fuel injection amount. The fuel injector on time may be based on values in a table or function that is part of the selected calibration that is stored in RAM. Method 600 proceeds to exit.

In this way, 32-bit floating point numbers may be converted into binary encoded values to save memory when storing multiple vehicle calibrations in controller memory. The binary encoded values may be converted back to 32-bit floating point values so that they may be used via a strategy (e.g., executable code that reads sensor data and adjusts actuators) within the controller.

Thus, the method of FIGS. 6 and 7 provides for an operating method for a vehicle, comprising: storing a group of vehicle calibrations into controller read-only memory, each calibration in the group of vehicle calibrations including a table or function that is common to the group of vehicle calibrations, values in the table or function stored as encoded binary values; converting the encoded binary values to floating point values and storing the floating point values in random access memory; and adjusting one or more actuators responsive to the floating point numbers. The method further comprises receiving data via one or more satellites, estimating a position of a vehicle in response to the data, and converting the encoded binary values in response to the estimated position of the vehicle. The method includes where the encoded binary values are based on frequency of occurrence of a value in the table or function. The method includes where converting the encoded binary values to floating point numbers includes looking up the floating point numbers based on the encoded binary values. The method includes where looking up the floating point numbers includes looking up the floating point numbers from a table or function. The method includes where the encoded binary values are a function of a tree structure. The method includes where the one or more actuators includes an inverter coupled to an electric machine.

The method of FIGS. 6 and 7 also provides for an operating method for a vehicle, comprising: converting a first group of binary encoded vehicle calibration parameters that are based on a geographical position of a vehicle into a first group of floating point vehicle calibration parameters and adjusting an actuator responsive to the first group of floating point vehicle calibration parameters; and converting a second group of binary encoded vehicle calibration parameters that are based on the geographical position of the vehicle into a second group of floating point vehicle calibration parameters and adjusting the actuator responsive to the second group of floating point vehicle calibration parameters in response to the geographical position of the vehicle changing. The method includes where the first group of vehicle calibration parameters are stored in a table or function common to a plurality of calibrations. The method includes where the second group of vehicle calibration parameters are stored in the table or function common to the plurality of calibrations. The method includes where the a first group of binary encoded vehicle calibration parameters are based on frequency of occurrence of a value in table or function. The method includes where the converting is based on a table or function. The method includes where the actuator is an engine actuator, transmission actuator, or an electric machine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. An operating method for a vehicle, comprising:
storing a group of vehicle calibrations into controller read-only memory, each calibration in the group of vehicle calibrations including a table or function that is common to the group of vehicle calibrations, values in the table or function stored as encoded binary values;
converting the encoded binary values to floating point values and storing the floating point values in random access memory; and
adjusting one or more actuators responsive to the floating point numbers.

2. The method of claim 1, further comprising receiving data via one or more satellites, estimating a position of a vehicle in response to the data, and converting the encoded binary values in response to the estimated position of the vehicle.

3. The method of claim 1, where the encoded binary values are based on frequency of occurrence of a value in the table or function.

4. The method of claim 1, where converting the encoded binary values to floating point numbers includes looking up the floating point numbers based on the encoded binary values.

5. The method of claim 4, where looking up the floating point numbers includes looking up the floating point numbers from a table or function.

6. The method of claim 1, where the encoded binary values are a function of a tree structure.

7. The method of claim 1, where the one or more actuators includes an inverter coupled to an electric machine.

8. A system, comprising:
an engine;
a motor/generator;
a transmission mechanically coupled to the engine and the motor/generator; and
a controller including executable instructions stored in non-transitory memory that cause the controller to convert binary encoded baseline calibration parameters stored in controller memory into floating point calibration parameters, and adjust an actuator of one or more of the engine, transmission, or motor/generator responsive to the floating point calibration parameters.

9. The system of claim 8, further comprising additional instructions to convert binary encoded alternative calibration parameters stored in controller memory into alternative floating point calibration parameters, and adjust the actuator of one or more of the engine, transmission, or motor/generator responsive to the alternative floating point calibration parameters.

10. The system of claim 8, further comprising additional instructions to determine a position of a vehicle and convert the binary encoded baseline calibration parameters stored in controller memory into floating point calibration parameters responsive to the position of the vehicle.

11. The system of claim 10, further comprising additional instructions to determine the position of the vehicle and convert alternative binary encoded baseline calibration parameters stored in controller memory into alternative floating point calibration parameters responsive to the position of the vehicle.

12. The system of claim 8, where the binary encoded baseline calibration parameters are parameters of a table or function.

13. The system of claim 12, where the binary encoded baseline calibration parameters are based on a plurality of floating point values included in a plurality of tables or functions.

14. The system of claim 12, where the table or function is common to a plurality of calibrations.

15. An operating method for a vehicle, comprising:
converting a first group of binary encoded vehicle calibration parameters that are based on a geographical position of a vehicle into a first group of floating point vehicle calibration parameters and adjusting an actuator responsive to the first group of floating point vehicle calibration parameters; and
converting a second group of binary encoded vehicle calibration parameters that are based on the geographical position of the vehicle into a second group of floating point vehicle calibration parameters and adjusting the actuator responsive to the second group of floating point vehicle calibration parameters in response to the geographical position of the vehicle changing.

16. The method of claim 15, where the first group of vehicle calibration parameters are stored in a table or function common to a plurality of calibrations.

17. The method of claim 16, where the second group of vehicle calibration parameters are stored in the table or function common to the plurality of calibrations.

18. The method of claim 16, where the a first group of binary encoded vehicle calibration parameters are based on frequency of occurrence of a value in table or function.

19. The method of claim 15, where the converting is based on a table or function.

20. The method of claim 15, where the actuator is an engine actuator, transmission actuator, or an electric machine.

* * * * *